Figure 1:
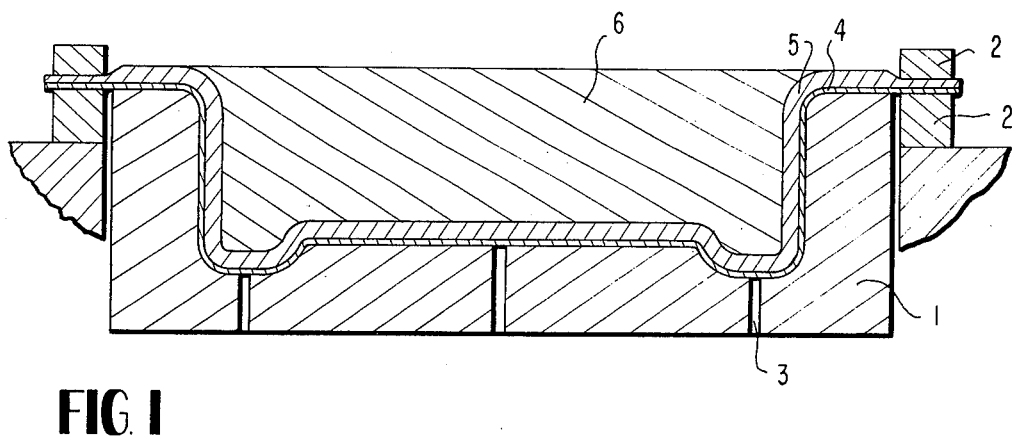

United States Patent [19]
Alfter et al.

[11] 3,954,537
[45] May 4, 1976

[54] PRODUCTION OF MULTIPLE-LAYER SHEETS, PANELS, SHAPED ARTICLES

[75] Inventors: Franz-Werner Alfter, Siegburg; Hans-Ulrich Breitscheidel, Troisdorf; Heinz-Gerd Reinkemeyer, Troisdorf; Manfred Simm, Troisdorf, all of Germany

[73] Assignee: Dynamit Nobel Aktiengesellschaft, Germany

[22] Filed: Dec. 31, 1974

[21] Appl. No.: 537,762

[30] Foreign Application Priority Data
Dec. 31, 1973  Germany............................ 2365203

[52] U.S. Cl................................. 156/82; 156/272; 156/306; 428/305; 428/310; 428/315; 428/482

[51] Int. Cl.²..................... B32B 31/26; B32B 31/28

[58] Field of Search........... 428/304, 305, 310, 311, 428/315, 482; 156/77, 78, 79, 82, 497, 272, 306, 380

[56] References Cited
UNITED STATES PATENTS
3,829,343   8/1974   Remmert........................... 428/315

*Primary Examiner*—William A. Powell
*Assistant Examiner*—Brian J. Leitten
*Attorney, Agent, or Firm*—Craig & Antonelli

[57] ABSTRACT

A process for the production of multiple-layer sheets, panels, shaped articles, or the like laminates having at least one layer of polyurethane foam material wherein at least one side of the polyurethane foam layer is bonded under the action of heat to a layer of cross-linked polyethylene foam material.

7 Claims, 2 Drawing Figures

PRODUCTION OF MULTIPLE-LAYER SHEETS, PANELS, SHAPED ARTICLES

This invention relates to the production of multiple-layered sheets, panels, shaped articles, or the like laminates having at least one layer of polyurethane foam.

In order to improve the properties of such laminates, it is known to produce multiple-layer composite articles from various materials, also called sandwich elements. The present invention is based on the problem of providing such a multiple-layer composite article which combines, in particular, the various characteristics of different foam materials, such as polyurethane foams and polyethylene foams, in one composite article. It is known that non-crosslinked polyethylene foam materials or polyethylene films do not directly bond to polyurethane foam materials under the influence of heat, so that additional adhesion promoters or tackifiers must be used, or special methods must be employed, such as a pretreatment of the polyethylene surface with chemical agent or mechanical treatments. For this reason, polyethylene, in the form of a film or as foam material, is even utilized often as a parting agent in the foaming of polyurethane foam material.

It has now been found that crosslinked polyethylene foam materials can be bonded, under the effect of heat, with very good adhesion and without the use of tackifiers to polyurethane foam materials. The multiple-layer sheets, panels, shaped articles, or the like of this invention are distinguished in that at least one side of a polyurethane foam layer is bonded to a layer of crosslinked polyethylene foam material under the action of heat. The thus-obtained adhesive strength between the polyurethane foam material and the crosslinked polyethylene foam material surpasses, in part, the tensile strength (i.e. tear resistance) of the individual foam materials employed, so that in case of a separation of the materials, either the polyurethane foam or the crosslinked polyethylene foam is destroyed.

Suitable crosslinked polyethylene foams are, in particular, closed-pore as well as open-pore crosslinked polyethylene foam materials which have been crosslinked either by chemical treatments or by irradiation. All types of polyurethane foams are suitable for use in this invention, such as soft polyurethane, soft integral polyurethane foam, semihard polyurethane, hard polyurethane foam, and hard integral polyurethane foam.

All commercial polyurethane foams, hard foams, soft foams, etc. are suitable. Commercial trade names in Germany are MOLTOPREN, BAYDUR, BAYFLEX (registered trademark of Bayer AG.), and PHONIX integral foam. The polyurethanes utilized for the foaming process are produced conventionally by crosslinking isocyanate resins with reactive agents. Suitable reactive agents are polyesters and/or polyethers. Polyurethane hard foam can be produced chemically, by splitting off gaseous $CO_2$ when adding water to the reaction mixture and with haloalkanes as physical blowing agents which are vaporized due to the heat of reaction. Polyurethane soft foam is freely foamed continuously on block lines, primarily with water as the chemical blowing agent.

The crosslinked polyethylene foam can have the following composition: Starting with 100% by weight of high-pressure polyethylene, it is possible to add blowing agents, e.g. azodicarbonamide, in an amount of between 2 and 22% by weight, based on the high-pressure polyethylene, preferably 10–18% by weight; the crosslinking agents added, e.g. dicumyl peroxide, range between 0.5 and 2% by weight, based on the high-pressure polyethylene, preferably 1% by weight.

Suitable for bonding the crosslinked polyethylene foams to the polyurethane foams under the influence of heat are bonding procedures such as flame laminating, hot-air laminating, hot-wire welding, V-blade heat welding, lamination in an irradiation field (IR radiator), as well as foam-backing of crosslinked polyethylene foams in predominantly closed molds. The temperatures required for the bonding by application of heat range preferably between 170° and 400°C.

By using the present invention, novel multiple-layer elements with new, variegated material combinations are provided which, in part, result in shaped articles which can be utilized with extraordinary advantage. With a unilateral or bilateral lamination of a polyurethane foam with a closed-pore, crosslinked polyethylene foam material, a rigid, high-load-bearing sandwich element having special resiliency and padding properties is produced which, additionally, has a high aging resistance and a very low water absorption.

It is furthermore possible to join the foam layers also with further layers, e.g. elastic covers of films, textiles, fabrics, knit materials, etc.

Examples for suitable laminating materials are films of soft PVC, polyamide, polyesters, ABS (acrylonitrile-butadiene-styrene resins), polyethylene, etc.

Furthermore suitable are textile substrate materials, for example coated with soft PVC, examples for such carrier materials being polyamide, cotton, cellulose-base fibers, mixed fibers, etc. These substrate materials can be knitted or woven or matted. By subsequent shaping, for example by vacuum forming and an immediately following foaming of the negative side, multiple-layer elements are produced which are usable, for example, as upholstery components for the furniture industry or automobile industry. Such multiple-layer components, when manufactured in accordance with this invention, have the advantage of an economical manufacture, since steps such as sewing and subsequent stuffing with polyurethane foam are eliminated and more complicated configurations are possible. Such multiple-layer elements are thus distinguished by a variable surface texture, such as a smooth, clinging surface or a textile surface, a soft, elastic upholstery layer, as well as optionally a load supporting, hard core, which can be joined in only a few operating steps firmly to one another under simultaneous shaping.

Figure 2:
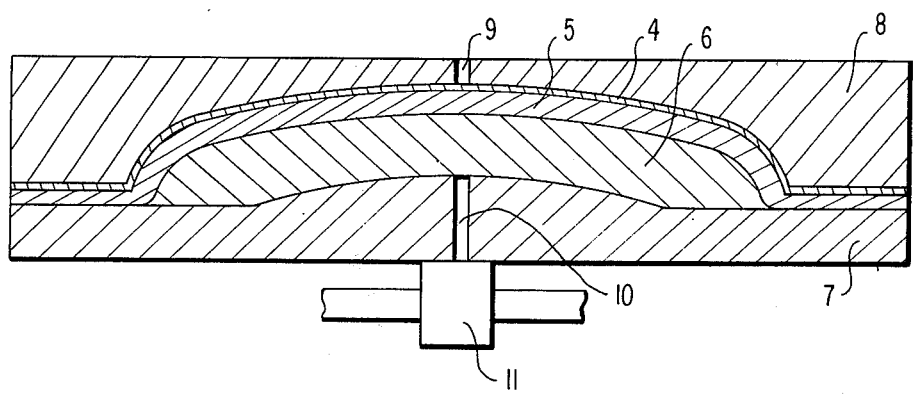

The invention will be further understood from the following detailed description and with reference to the drawing, wherein:

FIG. 1 shows a schematic cross-section through a vacuum mold containing multiple-layer shaped article, and FIG. 2 shows a schematic cross-section through a closed mold containing a multiple-layer shaped article.

A plate-shaped, multi-layered sandwich element with properties not afforded by the individual foam material is obtained by bonding a polyurethane foam material on one or both sides with a crosslinked polyethylene foam material. For example, a crosslinked, closed-pore polyethylene foam, having a weight per unit volume of 100 kg./m$^3$, with a thickness of 5 mm., made of high-pressure polyethylene with about 4.5% azodicarbonamide as the blowing agent and about 1% of dicumyl peroxide as the crosslinking agent is bonded by laminating in the IR field or by means of flame at 250°C. with an open-pore soft polyurethane foam having a weight per unit volume of 25 kg./m³, also of a thickness of 15 mm. This bonding is carried out either on one side or on both sides. A rigid, load-bearing foam element is thus produced having good resiliency and upholstery and padding properties, with a closed surface.

To produce a multiple-layer shaped article of various foam materials, the vacuum forming method illustrated in FIG. 1 may be utilized, for example. A crosslinked, closed-pore polyethylene foam having a density or weight per unit volume of 30 kg./m³, a thickness of 5 mm., and made of high-pressure polyethylene with about 15.1% of azodicarbonamide as the blowing agent and 1% of dicumyl peroxide as the crosslinking agent, is laminated on one side with a well stretchable textile covering 4 for example a polyamide knit with a longitudinal elongation of 70% and a transverse elongation of 30%, weight 200 g./m², and the cut-to-size piece is inserted in the stretching frame 2 of the vacuum mold 1 and shaped in a conventional vacuum forming method by producing a vacuum via bores 3. The shaped article 4, 5 is then, immediately after the molding step, held in the vacuum mold 1 and surrounded in the still hot condition at about 130°–150°C. with soft polyurethane foam. The textile layer 4 is in direct contact with the mold 1, while the soft polyurethane foam 6 adjoins the crosslinked polyethylene foam material 5 and enters into an intimate adhesive bond therewith. A component manufactured according to the present process and with the use of the mold according to FIG. 1 can be utilized, for example, as an upholstery part for the furniture industry or the automobile industry. The thus-productd multiple-layer composite element possesses the various required characteristics, such as a rugged, optionally textile-type surface, a padded layer, and a soft core with corresponding upholstery characteristics. It is also possible to cover the thus-produced three-layer molded component by means of a further cover layer on the underside.

Another example for the production of multiple-layer composite elements according to the invention is illustrated in FIG. 2. In this embodiment, a crosslinked, closed-pore polyethylene foam material 5, having a density of 30 kg./m³, a thickness of 10 mm. and made of high-pressure polyethylene with about 15.1% of azodicarbonamide as the blowing agent and 1% of dicumyl peroxide as the crosslinking agent is laminated unilaterally with a stretchable covering 4 such as a synthetic leather sheet of PVC on tricot, having a density of about 360 g./m², and a total thickness of 300 μ. From the laminated sheet from, cut-to-size sections are produced and inserted in the closed foaming mold 7, 8. On the side facing away from the textile, the shaped part is then foam-backed with integral hard polyurethane foam by employing the injection head 11 via the injection bore 10. On the opposite side, the venting bore 9 is arranged in the lower part 8 of the mold. The multiple-layer shaped article produced in this way offers a padded, smooth, soft visible side and a load-bearing, hard, shock-absorbing, and energy-dissipating backside and is usable, for example, as an automobile dome lining. It is also excellently suitable as a lining for doors or the like.

The heat present in the polyurethane foam during the foaming step by means of an injection molding head is sufficient for producing the satisfactory adhesive bond between the polyurethane foam 6 and the crosslinked polyethylene foam material. To produce the composite molded component, the foaming pressure produced during the foaming step and/or the foaming heat formed during the foaming are sufficient to bind the materials. No additional external pressures need to be applied.

In addition to molded articles open on one side, it is also possible to manufacture molded articles closed off toward the outside with a continuous surface and/or with a closed envelope of crosslinked polyethylene foam layer with a solid core of polyurethane foam.

The use of crosslinked polyethylene foam material as a layer adjoining a polyurethane foam layer and being bonded to the latter under the action of heat results, in accordance with this invention, in a multiple-layer composite component with a great variety of properties not shown by the individual foam materials in total.

The weight per unit volume of the used polyurethane foams can range between 20 and 400 kg./m³, preferably between 50 and 100 kg./m³; the weight per unit volume of the crosslinked polyethylene foam is between 20 and 200 kg./m³, preferably between 25 and 70 kg./m³.

While the novel embodiments of the invention have been described, it will be understood that various omissions, modifications and changes in these embodiments may be made by one skilled in the art without departing from the spirit and scope of the invention.

What is claimed is:

1. A process for the production of multiple-layer sheets, panels, shaped articles, or the like laminate having at least one layer of polyurethane foam material, which comprises bonding at least one side of the polyurethane foam layer under the action of heat to a layer of crosslinked polyethylene foam material.

2. The process according to claim 1, wherein said polyethylene foam material is a closed-pore ethylene foam that has been crosslinked chemically or by means of irradiation.

3. The process according to claim 1, wherein a layer of the crosslinked polyethylene foam material is laminated on one side with an elastic, strechable film, fabric, knit, or the like and is then bonded on the other side to a layer of the polyurethane foam material.

4. The process according to claim 1, wherein the cross-linked polyethylene foam layer is preformed.

5. The process according to claim 1, wherein the heat for bonding the crosslinked polyethylene foam material to the polyurethane foam material is provided by flame-laminating, hot-air laminating, hot-wire welding, V-blade heat welding, or an irradiated field.

6. The process according to claim 1, wherein the bonding of the crosslinked polyethylene foam layer to the polyurethane foam layer is conducted with simultaneous shaping of the materials.

7. The process according to claim 1, wherein a crosslinked polyethylene foam layer is initially molded into a desired shape by vacuum forming and is then directly thereafter filled with and bonded to the polyurethane foam material.

* * * * *